(12) United States Patent
Li

(10) Patent No.: US 10,367,774 B2
(45) Date of Patent: Jul. 30, 2019

(54) METHODS, SYSTEMS, AND DEVICES FOR ENRICHING MICROBLOG PAGE

(71) Applicant: Tencent Technology (Shenzhen) Company Limited, Shenzhen, Guangdong (CN)

(72) Inventor: Bing Li, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 665 days.

(21) Appl. No.: 14/948,826

(22) Filed: Nov. 23, 2015

(65) Prior Publication Data
US 2016/0080308 A1 Mar. 17, 2016

Related U.S. Application Data

(63) Continuation of application No. PCT/CN2014/084229, filed on Aug. 13, 2014.

(30) Foreign Application Priority Data

Aug. 14, 2013 (CN) .......................... 2013 1 0353761

(51) Int. Cl.
*G06F 15/16* (2006.01)
*H04L 12/58* (2006.01)
(Continued)

(52) U.S. Cl.
CPC ............ *H04L 51/32* (2013.01); *G06F 16/957* (2019.01); *G06F 17/211* (2013.01);
(Continued)

(58) Field of Classification Search
CPC ....... H04L 51/32; H04L 67/34; H04L 63/083; H04L 51/18; H04L 51/08; G06F 17/211;
(Continued)

(56) References Cited

U.S. PATENT DOCUMENTS 8,838,719 B1 * 9/2014 Faulk .................... H04L 51/043
709/203
2007/0174774 A1 * 7/2007 Lerman ................ G11B 27/034
715/723

(Continued)

FOREIGN PATENT DOCUMENTS

CN 101136873 A 3/2008
CN 101267299 A 9/2008
(Continued)

OTHER PUBLICATIONS

Office Action dated Jul. 3, 2018 for corresponding Chinese Application No. 201310353761.0, 14 pages.
(Continued)

*Primary Examiner* — Suraj M Joshi
*Assistant Examiner* — Jaren Means
(74) *Attorney, Agent, or Firm* — Brinks Gilson & Lione

(57) ABSTRACT

The present disclosure discloses methods, systems and devices providing enriched message on a microblog page. The methods include providing the microblog page on a terminal of a user, the page being displayed in a timeline format; and providing an enriched message associated with an interactive application in the timeline, wherein the enriched message is configured to direct the terminal to present the interactive application in the timeline when the user clicks the enriched message.

18 Claims, 4 Drawing Sheets

(51) Int. Cl.
   *G06F 21/56*    (2013.01)
   *G06Q 50/00*    (2012.01)
   *G06F 17/21*    (2006.01)
   *H04L 29/06*    (2006.01)
   *H04L 29/08*    (2006.01)
   *G06F 16/957*   (2019.01)

(52) U.S. Cl.
   CPC ........... *G06F 21/566* (2013.01); *G06Q 50/01* (2013.01); *H04L 51/08* (2013.01); *H04L 51/18* (2013.01); *H04L 63/083* (2013.01); *H04L 67/34* (2013.01)

(58) Field of Classification Search
   CPC .. G06F 21/566; G06F 17/30899; G06Q 50/01
   See application file for complete search history.

(56) References Cited

U.S. PATENT DOCUMENTS

2010/0030648 A1    2/2010  Manolescu et al.
2012/0173635 A1*   7/2012  Wormald ............. G06Q 10/107
                                                    709/206
2013/0297493 A1*   11/2013 Linden ................. G06Q 20/28
                                                    705/39
2014/0059203 A1*   2/2014  Trabelsi ............... G06Q 10/10
                                                    709/224

FOREIGN PATENT DOCUMENTS

| CN | 102480550 A | 5/2012 |
| CN | 102509231 A | 6/2012 |
| CN | 102821085 A | 12/2012 |
| CN | 102843399 A | 12/2012 |
| CN | 103067252 A | 4/2013 |
| CN | 103186531 A | 7/2013 |

OTHER PUBLICATIONS

International Search Report dated Nov. 18, 2014 in International Application No. PCT/CN2014/084229.
Written Opinion dated Nov. 18, 2014 in International Application No. PCT/CN2014/084229.
Second Office Action, with Search Report, in Chinese Application No. 201310353761.0, dated Jan. 9, 2019, pp. 1-12.

* cited by examiner

METHODS, SYSTEMS, AND DEVICES FOR ENRICHING MICROBLOG PAGE

PRIORITY STATEMENT

This application is a continuation of International Application No. PCT/CN2014/084229, filed on Aug. 13, 2014, in the State Intellectual Property Office of the People's Republic of China, which claims the priority benefit of Chinese Patent Application No. 201310353761.0 field on Aug. 14, 2013, the disclosures of which are incorporated herein in their entirety by reference.

TECHNICAL FIELD

The present disclosure relates to an Internet technology. Specifically, the present disclosure relates to methods, systems and devices for enriching a microblog page.

BACKGROUND

Currently, contents shown on a webpage of a microblog of a user, for example, in a timeline page, are usually presented as: texts, pictures, audios, and videos. The types of media available on such timeline pages are limited and commercial value of such timeline pages are not fully explored.

SUMMARY

In view of the above, the present disclosure provides a method, system and device for enriching a microblog page, which can improve the utilization of the microblog page.

According to an aspect of the present disclosure, a server for providing an enriched message in a microblog page may comprise a processor-readable storage medium comprising a set of instructions for providing an enriched message in an online social platform; and a processor in communication with the medium. The processor is configured to execute the set of instructions to provide a page of the online social platform on a terminal of a user, the page being displayed in a timeline format; and provide an enriched message associated with an interactive application in the timeline, wherein the enriched message is configured to direct the terminal to present the interactive application in the timeline when the user clicks the enriched message.

According to another aspect of the present disclosure, a method for providing an enriched message in a microblog page may comprise providing, by an online social platform, a page of the online social platform on a terminal of a user, the page being displayed in a timeline format; and providing, by the online social platform, an enriched message associated with an interactive application in the timeline, wherein the enriched message is configured to direct the terminal to present the interactive application in the timeline when the user clicks the enriched message.

BRIEF DESCRIPTION OF THE DRAWINGS

The above and other features and advantages will become more apparent by describing in detail example embodiments thereof with reference to the attached drawings in which.

DETAILED DESCRIPTION

The present disclosure provides a solution for enriching a microblog page. Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. The following detailed description is, therefore, not intended to be limiting on the scope of what is claimed.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 5:
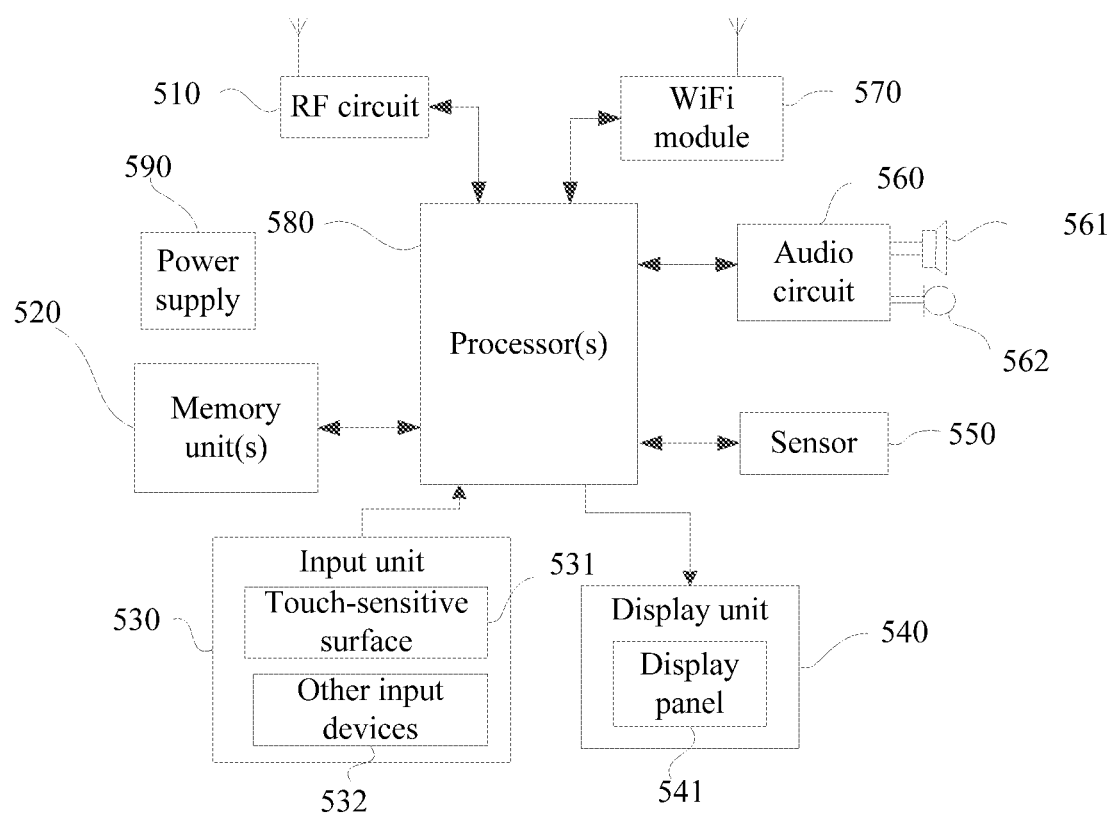
FIG. 5 illustrates a structural diagram of an intelligent terminal according to the example embodiments of the present disclosure.

FIG. 5 illustrates a structural diagram of an intelligent terminal according to the example embodiments of the present disclosure. The intelligent terminal may be implemented as systems and/or to operate methods disclosed in the present disclosure.

The intelligent terminal may include an RF (Radio Frequency) circuit 510, one or more than one memory unit(s)

520 of computer-readable memory media, an input unit 530, a display unit 540, a sensor 550, an audio circuit 560, a WiFi (wireless fidelity) module 570, at least one processor 580, and a power supply 590. Those of ordinary skill in the art may understand that the structure of the intelligent terminal shown in FIG. 5 does not constitute restrictions on the intelligent terminal. Compared with what may be shown in the figure, more or fewer components may be included, or certain components may be combined, or components may be arranged differently.

The RF circuit 510 may be configured to receive and transmit signals during the course of receiving and transmitting information and/or phone conversation. Specifically, after the RF circuit 510 receives downlink information from a base station, it may hand off the downlink information to the processor 580 for processing. Additionally, the RF circuit 510 may transmit uplink data to the base station. Generally, the RF circuit 510 may include, but may be not limited to, an antenna, at least one amplifier, a tuner, one or multiple oscillators, a subscriber identification module (SIM) card, a transceiver, a coupler, an LNA (Low Noise Amplifier), and a duplexer. The RF circuit 510 may also communicate with a network and/or other devices via wireless communication. The wireless communication may use any communication standards or protocols available or one of ordinary skill in the art may perceive at the time of the present disclosure. For example, the wireless communication may include, but not limited to, GSM (Global System of Mobile communication), GPRS (General Packet Radio Service), CDMA (Code Division Multiple Access), WCDMA (Wideband Code Division Multiple Access), LTE (Long Term Evolution), email, and SMS (Short Messaging Service).

The memory unit 520 may be configured to store software programs and/or modules. The software programs and/or modules may be sets of instructions to be executed by the processor 580. The processor 580 may execute various functional applications and data processing by running the software programs and modules stored in the memory unit 520. The memory unit 520 may include a program memory area and a data memory area, wherein the program memory area may store the operating system and at least one functionally required application program (such as the audio playback function and image playback function); the data memory area may store data (such as audio data and phone book) created according to the use of the intelligent terminal. Moreover, the memory unit 520 may include high-speed random-access memory and may further include non-volatile memory, such as at least one disk memory device, flash device, or other volatile solid-state memory devices. Accordingly, the memory unit 520 may further include a memory controller to provide the processor 580 and the input unit 530 with access to the memory unit 520.

The input unit 530 may be configured to receive information, such as numbers or characters, and create input of signals from keyboards, touch screens, mice, joysticks, optical or track balls, which are related to user configuration and function control. Specifically, the input unit 530 may include a touch-sensitive surface 531 and other input devices 532. The touch-sensitive surface 531, also called a touch screen or a touch pad, may collect touch operations by a user on or close to it (e.g., touch operations on the touch-sensitive surface 531 or close to the touch-sensitive surface 531 by the user using a finger, a stylus, and/or any other appropriate object or attachment) and drive corresponding connecting devices according to preset programs. The touch-sensitive surface 531 may include two portions, a touch detection device and a touch controller. The touch detection device may be configured to detect the touch location by the user and detect the signal brought by the touch operation, and then transmit the signal to the touch controller. The touch controller may be configured to receive the touch information from the touch detection device, convert the touch information into touch point coordinates information of the place where the touch screen may be contacted, and then send the touch point coordinates information to the processor 580. The touch controller may also receive commands sent by the processor 580 for execution. Moreover, the touch-sensitive surface 531 may be realized by adopting multiple types of touch-sensitive surfaces, such as resistive, capacitive, infrared, and/or surface acoustic sound wave surfaces. Besides the touch-sensitive surface 531, the input unit 530 may further include other input devices 532, such as the input devices 532 may also include, but not limited to, one or multiple types of physical keyboards, functional keys (for example, volume control buttons and switch buttons), trackballs, mice, and/or joysticks.

The display unit 540 may be configured to display information input by the user, provided to the user, and various graphical user interfaces on the intelligent terminal. These graphical user interfaces may be composed of graphics, texts, icons, videos, and/or combinations thereof. The display unit 540 may include a display panel 541. The display panel 541 may be in a form of an LCD (Liquid Crystal Display), an OLED (Organic Light-Emitting Diode), or any other form available at the time of the present disclosure or one of ordinary skill in the art would have perceived at the time of the present disclosure. Furthermore, the touch-sensitive surface 531 may cover the display panel 541. After the touch-sensitive surface 531 detects touch operations on it or nearby, it may transmit signals of the touch operations to the processor 580 to determine the type of the touch event. Afterwards, according to the type of the touch event, the processor 580 may provide corresponding visual output on the display panel 541. In FIG. 5, the touch-sensitive surface 531 and the display panel 541 realize the input and output functions as two independent components. Alternatively, the touch-sensitive surface 531 and the display panel 541 may be integrated to realize the input and output functions.

The intelligent terminal may further include at least one type of sensor 550, for example, an optical sensor, a motion sensor, and other sensors. An optical sensor may include an environmental optical sensor and a proximity sensor, wherein the environmental optical sensor may adjust the brightness of the display panel 541 according to the brightness of the environment, and the proximity sensor may turn off the display panel 541 and/or back light when the intelligent terminal may be moved close an ear of the user. As a type of motion sensor, a gravity acceleration sensor may detect the magnitude of acceleration in various directions (normally three axes) and may detect the magnitude of gravity and direction when it may be stationary. The gravity acceleration sensor may be used in applications of recognizing the attitude of the intelligent terminal (e.g., switching screen orientation, related games, and magnetometer calibration) and functions related to vibration recognition (e.g., pedometers and tapping); the intelligent terminal may also be configured with a gyroscope, barometer, hygrometer, thermometer, infrared sensor, and other sensors.

An audio circuit 560, a speaker 561, and a microphone 562 may provide audio interfaces between the user and the intelligent terminal. The audio circuit 560 may transmit the electric signals, which are converted from the received audio data, to the speaker 561, and the speaker 561 may convert them into the output of sound signals; on the other hand, the microphone 562 may convert the collected sound signals into electric signals, which may be converted into audio data after they are received by the audio circuit 560; after the audio data may be output to the processor 580 for processing, it may be transmitted via the RF circuit 510 to, for example, another terminal; or the audio data may be output to the memory unit 520 for further processing. The audio circuit 560 may further include an earplug jack to provide communication between earplugs and the intelligent terminal.

WiFi may be a short-distance wireless transmission technology. Via the WiFi module 570, the intelligent terminal may help users receive and send emails, browse web pages, and visit streaming media. The WiFi module 570 may provide the user with wireless broadband Internet access.

The processor 580 may be the control center of the intelligent terminal. The processor 580 may connect to various parts of the entire intelligent terminal utilizing various interfaces and circuits. The processor 580 may conduct overall monitoring of the intelligent terminal by running or executing the software programs and/or modules stored in the memory unit 520, calling the data stored in the memory unit 520, and executing various functions and processing data of the intelligent terminal. The processor 580 may include one or multiple processing core(s). The processor 580 may integrate an application processor and a modem processor, wherein the application processor may process the operating system, user interface, and application programs, and the modem processor may process wireless communication.

The intelligent terminal may further include a power supply 590 (for example a battery), which supplies power to various components. The power supply may be logically connected to the processor 580 via a power management system so that charging, discharging, power consumption management, and other functions may be realized via the power management system. The power supply 590 may further include one or more than one DC or AC power supply, a recharging system, a power failure detection circuit, a power converter or inverter, a power status indicator, and other random components.

Further, the intelligent terminal 500 may also include a camera, Bluetooth module, etc., which are not shown in FIG. 5.

Figure 6:
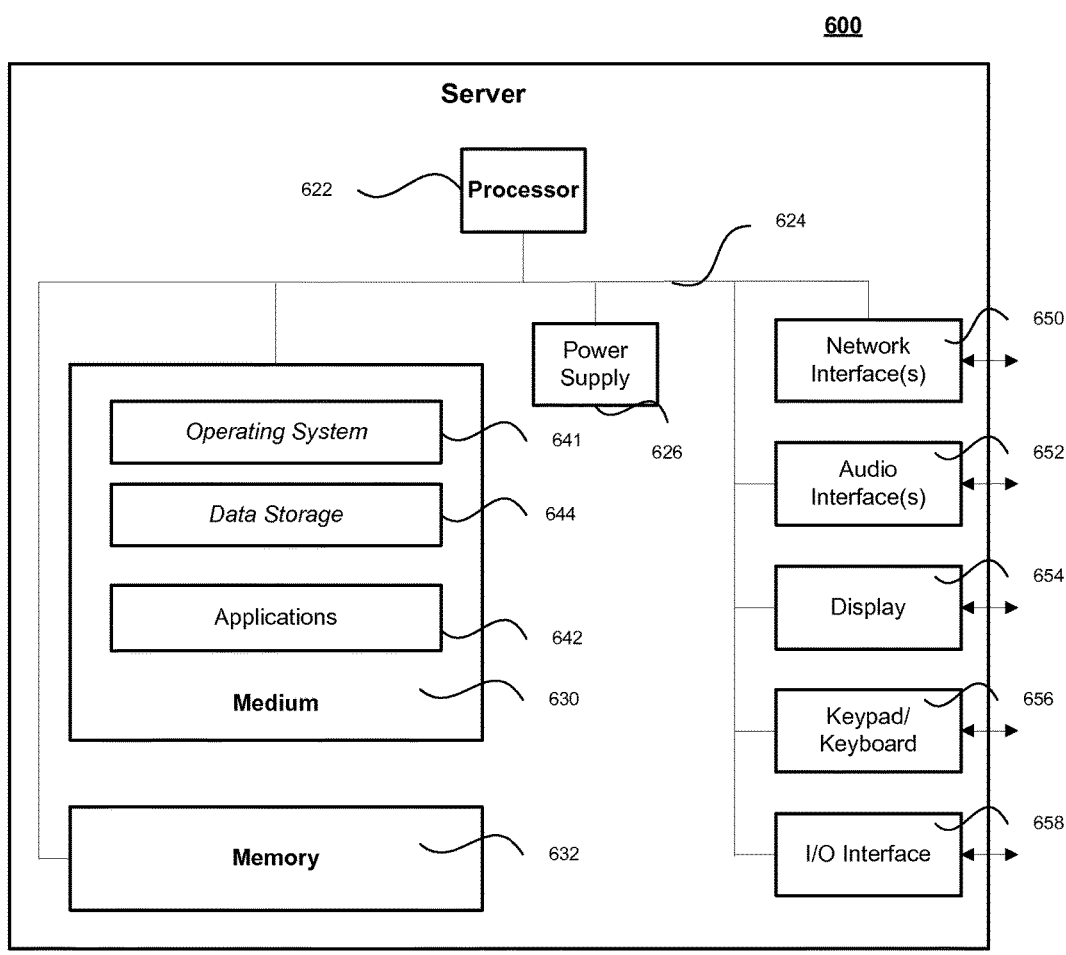
FIG. 6 is a schematic diagram illustrating an example embodiment of a server.

FIG. 6 is a schematic diagram illustrating an example embodiment of a server. The server 600 may be a server operating a microblog (e.g., twitter) platform and may connect to the terminal 500 locally or via a network. A Server 600 may vary widely in configuration or capabilities, but it may include one or more central processing units 622 and memory 632, one or more medium 630 (such as one or more mass storage devices) storing application programs 642 or data 644. The processing units 922 may execute the application programs 942 or data 944 to perform methods disclosed in the present disclosure.

The processor 622 may be in communication with the non-transitory processor-readable storage memory 632. For example, the non-transitory processor-readable storage media 632 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 632 may store sets of instructions, or units and/or modules that include the sets of instructions, for conducting operations and/or method steps described in the present disclosure.

The server 600 may further include, one or more power supplies 626, one or more wired or wireless network interfaces 650, one or more input/output interfaces 658, and/or one or more operating systems 641, such as WINDOWS SERVER™, MAC OS X™, UNIX™, LINUX™ FREEBSD™, or the like. Thus a server 600 may include, as examples, dedicated rack-mounted servers, desktop computers, laptop computers, set top boxes, mobile computational devices such as smart phones, integrated devices combining various features, such as two or more features of the foregoing devices, or the like.

The server 600 may serve as a search server or a content server. A content server may include a device that includes a configuration to provide content via a network to another device. A content server may, for example, host a site, such as a social networking site, examples of which may include, but are not limited to, FLICKER™, TWITTER™, FACEBOOK™, LINKEDIN™, or a personal user site (such as a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that include, but are not limited to, web services, third party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor type or programmable consumer electronics, etc.

Merely for illustration, only one processor will be described in terminals and servers that execute operations and/or method steps in the following example embodiments. However, it should be note that the client devices in the present disclosure may also include multiple processors, thus operations and/or method steps that are performed by one processor as described in the present disclosure may also be jointly or separately performed by the multiple processors. For example, if in the present disclosure a processor of a terminal or server executes both step A and step B, it should be understood that step A and step B may also be performed by two different processors jointly or separately in the terminal or server (e.g., the first processor executes step A and the second processor executes step B, or the first and second processors jointly execute steps A and B).

Also, in the present disclosure, when the terminal is conducting an operation through an online social platform, such conducting an operation on a microblog page, it may be understood that the sever of the online social platform terminal may also participate in the operation. For example, the operation may be initiated by the terminal by sending an instruction of the operation to the server, and the operation is completed by the server on the online social platform.

Figure 1:
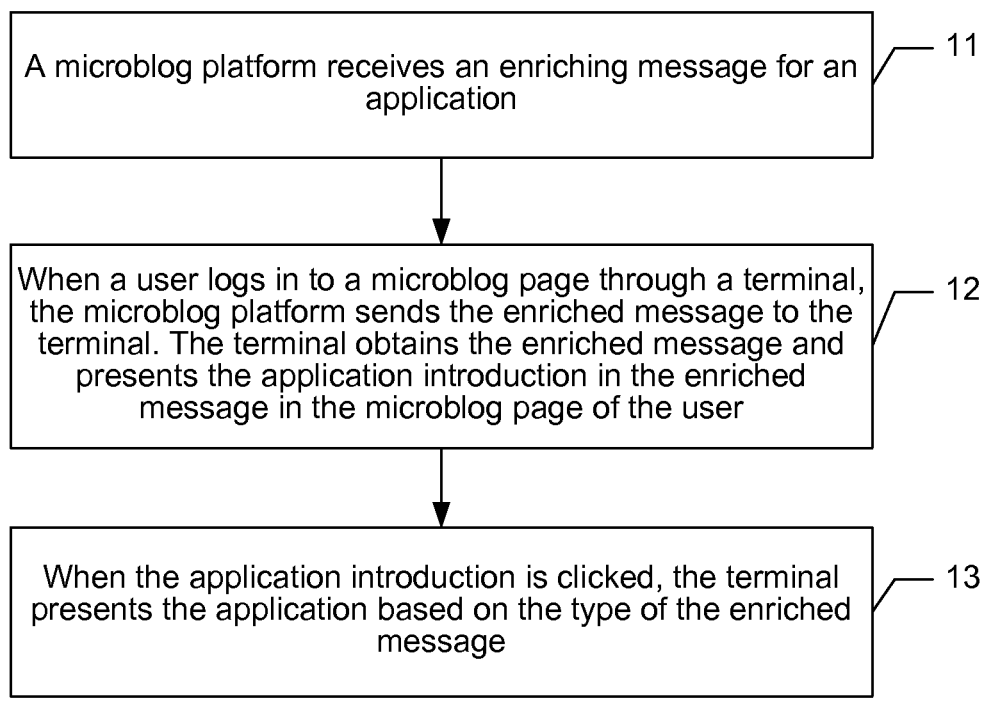
FIG. 1 is a flowchart of a method for enriching a microblog page according to example embodiments of the present disclosure.

FIG. 1 is a flowchart of an embodiment of a method for enriching a microblog page according to the present disclosure. The method includes the following steps.

Step 11: A microblog platform receives an enriched message for an application, wherein when the enriched message belongs to a first type, the enriched message includes an iframeurl and application introduction, and when the enriched message belongs to a second type, the enriched message includes a download address and application introduction.

Here, an iframe (Inline Frame) is an HTML document embedded inside another HTML document on a website. An iframeurl is a URL (uniform Resource Locator) of the embedded HTML. For terminals of different types, the enriched message may be different. For example, for a fixed terminal such as a personal computer (PC) that uses enriched iframe and wherein the microblog is displayed on a webpage through a web browser, the enriched message may include: an iframeurl and application introduction; but a mobile terminal such as a mobile phone may uses both enriched iframe and enriched calling of an application (such as jumping to a download site when a user clicks a link of an electronic game not installed in the mobile phone), thus for a mobile terminal wherein the microblog is displayed through an application of the microblog, the enriched message may include: a download address and application introduction.

The application may be social communication type of application or an interactive application, i.e., an application that requires a user to do substantial interaction with the application more than a music or video player. For example, the interactive application may be an online commercial service, such as an online shopping service (Amazon, EBay etc.). Thus user must make substantial interaction with the application in order to complete a transaction. The interactive application may also be an online game, wherein the user must made substantial interaction in order to play the game. The interactive application may also be a social communication application where different users communicate and interact with each other. The application introduction may include a name, brief introduction and a thumbnail image of the application, and the specific content of the application introduction depends on actual demands.

In actual application, when a third-party application developer needs to issue an enriched message for any application, the third-party developer is required to first apply and/or register an identification of the application (appid) on the microblog platform, and the appid of each application is unique. The third-party developer then may post the enriched message through a message-posting interface of the microblog platform using the appid. Correspondingly, the enriched message may further include the appid.

The enriched message may further include: a presentation format. The presentation format may be expressed in the form of a character string, and can be defined according to the specification of the microblog platform as follows: width:, height:, color: xxx. The presentation format is usually optional.

The microblog platform may store the received enriched message in a variable-length storage manner of tag, length, value (TLV).

Step 12: After determining that a user logs in to a microblog page through a terminal, the microblog platform sends the enriched message to the terminal. The terminal obtains the enriched message and presents (or the microblog platform makes the terminal to present) the application introduction in the enriched message in the microblog page of the user.

The microblog page may be in a timeline format. A timeline refers to a format to lay out a user's profile. A timeline is a collection of content published by a user and the user's friend being organized under a chronological order. Under timeline, content of the user's microblog, such as photos, stories, and experiences are aligned along an axis representing time. Thus the story of the user is displayed in visually a chronological order.

For example, for the enriched message in Step 11, the developer has 100 fans in total on the microblog platform, and the enriched message can be sent to the 100 fans and appears thereon.

After obtaining the enriched message, the terminal may determine whether the enriched message includes a presentation format, and if yes, present the enriched message according to the presentation format in the enriched message; otherwise, present the enriched message according to a default presentation format. The specific presentation position is not limited. For example, the enriched message may be inserted in the microblog page of the user for presentation according to the time order based on the issue time of the enriched message. Since the developers can set the presentation format according to their own preferences, the diversity of message presentation is improved.

Step 13: When the terminal or the microblog platform detects that the application introduction is clicked, if the terminal is a fixed terminal and the enriched message belongs to the first type, the terminal and/or the microblog platform presents, in an iframe form and in the microblog page of the user, the application content in the enriched message according to the iframeurl; and if the terminal is a mobile terminal and the enriched message belongs to the second type, the terminal and/or the microblog platform determines whether the application has been installed with the application, and if yes, directly starts the application; otherwise, jumps to the download address in the enriched message to download the application. For example, if the application is an electronic game and the terminal has not yet install the game, when the user clicks the enriched message associated with the game, the terminal and/or the microblog platform may direct the user to an installation landing page of the electronic game. Otherwise, if the game has already been installed in the terminal, when the user clicks the enriched message about the game, the terminal and/or the microblog platform may directly call the installed electronic game on the timeline, so that the user is able to play the game within the microblog webpage.

When the terminal detects that the user clicks the presented application introduction, if the terminal is a fixed terminal, and the enriched message belongs to the first type, the terminal can present the application content in the enriched message corresponding to the iframeurl to the user in an iframe in the microblog page. For example, if the application is a game, the corresponding application content may be a start interface of the game, and the size of the area occupied by the presented application content can be preset. If the terminal is a mobile terminal, and the enriched message belongs to the second type, the terminal can first determine whether it is installed with the application, and if yes, directly start the application, that is, jump out of the microblog page and directly call the application on the terminal; otherwise, jump to the download address in the enriched message to download the application, that is, guide the user to install the application.

In the above manner, for a game based application, a user can directly play a game on the microblog page. The application may also be an e-commerce based application (e.g., PayPal), such as a quick payment application on an e-commerce website (e.g., PayPal), so that by clicking the corresponding enriched message, the user may conduct a transaction on the commercial website directly through the microblog page without leaving the microblog webpage, thereby the user can directly complete a close loop transaction on the microblog page, and for a terminal based application, a user can directly call the application. Here, the close loop transaction refers to an O2O (online to offline) transaction that does not rely on a third party in order to complete. For example, in a transaction, a merchant uploads a product or a service to a website, the user browses the product or the service, proceeds to buy and pay the product or service online, and then picks up the product or enjoys the service offline to complete the transaction. If the entire transaction is completed by the merchant and the user without the help of a third party, this transaction is a close loop transaction.

If the terminal is a mobile terminal, and the enriched message belongs to the first type, the terminal can directly jump to a network address corresponding to the iframeurl and open the corresponding page within the current application; and if the terminal is a fixed terminal, and the enriched message belongs to the second type, the terminal can directly jump to an application channel address, where the address content is introduction, a download address, and the like of the application.

Further, in actual application, after presenting the application content, corresponding to the iframeurl, in the enriched message in the microblog page of the user, the terminal may further perform the following processing: obtaining an identification (openid) and passcode (openkey) of the application from the microblog platform, and providing the openid and openkey to a server corresponding to the application to log in the application, wherein the openid and openkey are generated by the microblog platform according to the appid of the application and login information (for example, login name) of the user in the microblog platform. The specific method for generating the openid and openkey is not limited. For example, the openid and openkey may be computed according to a predetermined algorithm.

Correspondingly, after directly starting the application, the terminal may further perform the following processing: if the application is a webview based application, obtaining the openid and openkey from the microblog platform, and providing the openid and openkey to the server corresponding to the application.

The terminal may provide the openid and openkey for the server corresponding to the application by using a symbol #, a predetermined symbol in a browser to obtain the openid and openkey. After the application server obtains the openid and openkey, the application server will consider the user as logged in the application (e.g., log in the user using the openid and openkey), thus the user does not need to perform a login procedure to the application when using the application, i.e., as long as the user logs in the microblog, she does not have to log in the application again because the login state of the user in the microblog platform will be the login state of the user in the application.

Further, after obtaining the openid and openkey, the server may send an enriched message to the fans and/or friends of the user by invoking an interface of the microblog platform, wherein the enriched message may be the same as the enriched message in Step 11, so as to facilitate promotion of the enriched message.

The manner that the terminal (or the microblog platform) presents the application content corresponding to the iframeurl in the microblog page of the user may be the following: presenting the application content corresponding to the iframeurl in the microblog page of the user in a drop-down manner. Correspondingly, if the application content includes an audio, a video or a game, when the application content is dropped down, the terminal may play the audio, video or game, and when the application content is pulled up, the terminal may suspend playing of the audio, video or game.

The server corresponding to the application is substantially used to control the playing and suspension of the audio, video or game. In actual application, the server needs to know in a certain manner whether the application content is dropped down or pulled up, and the specific manner may be as follows.

Two functions are defined in the iframe, which are function hideCall( ){ } and function showCall( ){ }, where the function hideCall( ){ } is corresponding to a pull-up operation, and the function showCall( ){ } is corresponding to a drop-down operation. When the application content is dropped down or pulled up, the value of the corresponding function changes, and the server may know by detecting the change of the value of the function whether the drop-down operation or the pull-up operation is performed, so as to correspondingly control the playing or suspension of the audio, video or game; or, when the pull-up operation is performed, the terminal may set a parameter behind iframeurl address# to hide=1, when the drop-down operation is performed, the terminal may set the parameter behind iframeurl address# to hide=0, and the server may know by detecting the change of the value of hide whether the drop-down operation or the pull-up operation is performed.

Since the enriched message is provided by a third-party developer, the security of the corresponding application content cannot be ensured without censorship, and the application content may include pornographic content, political content and the like. Therefore, the microblog platform needs to review the security of any received enriched message, and if the review is passed, that is, the security meets the requirement, the microblog platform accepts the enriched message; otherwise, rejects the enriched message.

Moreover, if merely manual review is used, since the number of enriched messages may be large, the workload is heavy; therefore, the solution of the present disclosure may adopt a manner of combining automatic analysis and manual review. For example, any received enriched message is sent to a bypass system, and the bypass system may extract corresponding address data through a crawler and review the address data through sensitive word filtering or other manners, where audios, videos, pictures and the like may be reviewed in a manner of combining hotspot analysis and a report button.

For any enriched message, although the microblog platform reviews the enriched message after receiving it, only those passing the review can be accepted. However, in actual application, the following situation may occur: the corresponding application content of an enriched message is secured when being reviewed, but is later modified into insecure content after passing the review. To avoid such a situation, the microblog platform performs the following processing at an interval of predetermined duration: determining whether the security of each received enriched message meets the requirement, and if not, setting the enriched message to be in a reviewed state, and prohibiting presentation of the enriched message in the microblog page. When for the same application the number of enriched messages that initially passed the censorship but later fails to meet the requirement is greater than a preset threshold, the microblog platform will not accept any more enriched message for the application. The specific value of the threshold depends on actual demands.

Figure 2:
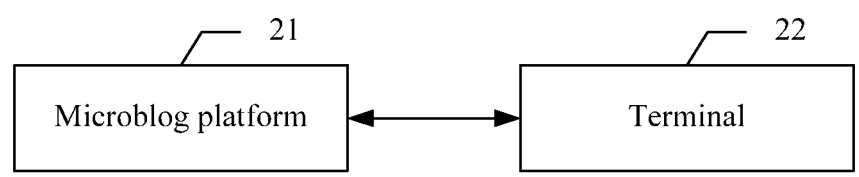
FIG. 2 is a schematic structural view of a system for enriching a microblog page according to the example embodiments the present disclosure.

Based on the above introduction, FIG. 2 is a schematic structural view of a system for enriching a microblog page according to the present disclosure. The system includes:

A microblog platform 21, configured to receive an enriched message for an application, wherein when the enriched message belongs to a first type, the enriched message includes an iframeurl and application introduction, and when the enriched message belongs to a second type, the enriched message includes a download address and application introduction; and A terminal 22, configured to presenting the application introduction in the microblog page after determining that a user logs in to a microblog page and obtaining the enriched message from the microblog platform 21; when the terminal detects that the application introduction is clicked, if the terminal is a fixed terminal and the enriched message belongs to the first type, presenting application content, corresponding to the iframeurl, in an iframe form in the microblog page; and if the terminal is a mobile terminal and the enriched message belongs to the second type, determining whether the terminal is installed with the application, and if yes, directly starting the application; otherwise, jumping to the download address to download the application.

Figure 3:
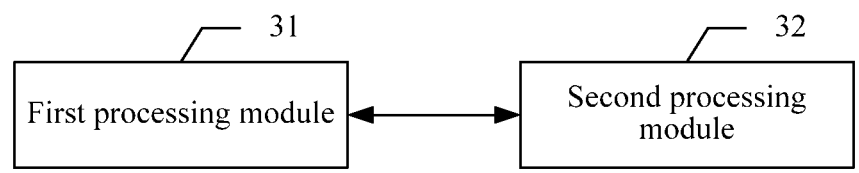
FIG. 3 is a schematic structural view of a microblog platform according to the example embodiments the present disclosure.

FIG. 3 is a schematic structural view of a microblog platform according to the present disclosure. The microblog platform may be operated by the server 600. As shown in FIG. 3, the microblog platform includes:

A first processing module 31, configured to receive an enriched message for any application, where when the enriched message belongs to a first type, the enriched message includes an iframeurl and application introduction, and when the enriched message belongs to a second type, the enriched message includes a download address and application introduction; and A second processing module 32, configured to provide the enriched message to a corresponding terminal.

The first processing module 31 may be further configured to determine whether the security of the enriched message meets the requirement, and if yes, accepting the enriched message; otherwise, rejecting the enriched message.

The first processing module 31 may be further configured to perform the following processing at an interval of predetermined duration: determining whether the security of each received enriched message meets the requirement, and if not, setting the enriched message to be in a reviewed state, and refraining from providing the enriched message for the terminal; and when the number of enriched messages, corresponding to the same application and failing to meet the requirement, in all the received enriched messages is greater than a preset threshold, stopping from accepting any more enriched message for the application.

Figure 4:
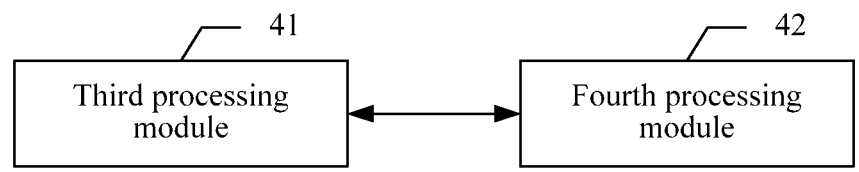
FIG. 4 is a schematic structural view of a terminal according to the present disclosure.

FIG. 4 is a schematic structural view of an embodiment of a terminal according to the present disclosure. The terminal may have a hardware structure of terminal 500. As shown in FIG. 4, the terminal includes:

A third processing module 41, configured to: after determining that a user logs in to a microblog page, and obtaining from a microblog platform an enriched message for any application, present application introduction in the enriched message in the microblog page, and send the enriched message to a fourth processing module 42, wherein when the enriched message belongs to a first type, the enriched message includes an iframeurl and application introduction, and when the enriched message belongs to a second type, the enriched message includes a download address and application introduction; and A fourth processing module 42, configured to: when the fourth processing module detects that the application introduction is clicked, if the terminal is a fixed terminal and the enriched message belongs to the first type, present application content, corresponding to the iframeurl, in an iframe form in the microblog page; and if the terminal is a mobile terminal and the enriched message belongs to the second type, determine whether the terminal is installed with the application, and if yes, directly starting the application; otherwise, jump to the download address to download the application.

The third processing module 41 may be further configured to determine whether the enriched message further includes a presentation format; and if yes, presenting the application introduction according to the presentation format in the enriched message; otherwise, presenting the application introduction according to a default presentation format.

The enriched message may further include: an appid.

Correspondingly, the fourth processing module 42 may be further configured to: after presenting the application content corresponding to the iframeurl in the microblog page, obtain openid and openkey from the microblog platform, and provide the openid and openkey for a server corresponding to the application, where the openid and openkey are generated according to the appid and login information of the user in the microblog platform.

The fourth processing module 42 may be further configured to: after directly starting the application, if it is determined that the application is a webview based application, obtain the openid and openkey from the microblog platform, and provide the openid and openkey for the server.

Specifically, the fourth processing module 42 may present the application content corresponding to the iframeurl in the microblog page in a drop-down manner.

Correspondingly, the fourth processing module 42 may be further configured to: if the application content includes an audio, a video or a game, when the application content is dropped down, play the audio, video or game, and when the application content is pulled up, suspend playing of the audio, video or game.

For the specific working process of the system and device embodiments, reference may be made to the corresponding description in the method embodiment, and the details will not be repeated herein.

To sum up, the above descriptions are merely preferred embodiments of the present disclosure, but are not intended to limit the present disclosure. Any modification, equivalent replacement, or improvement made without departing from the spirit and principle of the present disclosure shall fall within the protection scope of the present disclosure.

The invention claimed is:

1. A server for providing an enriched message in a microblog page, comprising:
   a processor-readable storage medium comprising a set of instructions for providing an enriched message in an online social platform; and
   a processor in communication with the processor-readable storage medium, configured to execute the set of instructions to:
   provide a page of the online social platform on a terminal of a user, the page being displayed in a timeline format;
   provide an enriched message associated with an interactive application in the timeline, wherein the enriched message is configured to direct the terminal to present the interactive application in the timeline when the user clicks the enriched message; and perform the following at an interval of predetermined duration:
  determining whether the enriched message meets a predetermined content security requirement,
  in response to determining that the enriched message does not meet the predetermined content security requirement, setting the enriched message in a reviewed state and prohibiting presentation of the enriched message on the online social platform, and
  when a number of enriched messages corresponding to the interactive application that initially met the predetermined content security requirement and was accepted by the online social platform but later fail to meet the predetermined content security requirement is greater than a preset threshold, stop accepting any further enriched message associated with the interactive application.

2. The server according to claim 1, wherein the online social platform is a microblog platform; and
  the interactive application is at least one of an electronic game application and an e-commerce application for closed loop transaction.

3. The server according to claim 1, wherein the enriched message is one of:
  a first type of enriched message, including an inline frame uniform resource locator (iframeurl) of the interactive application and an application introduction, or
  a second type of enriched message, including a download address for the interactive application and the application introduction.

4. The server according to claim 3, wherein when the page is a webpage of the online social platform, the presenting of the interactive application comprises:
  presenting application content corresponding to the iframeurl in an inline frame (iframe) form on the page when the enriched message is the first type of enriched message; and
  connecting to the download address when the enriched message is the second type of enriched message.

5. The server according to claim 3, wherein when the page is a page of an online social platform application for mobile terminals, the presenting of the interactive application comprises:
  opening to a network address corresponding to the iframeurl in an iframe form on the page when the enriched message is the first type of enriched message; and
  when the enriched message is the second type of enriched message:
  starting the interactive application when the interactive application is installed in the terminal, and
  downloading the interactive application from the download address when the interactive application is not installed in the terminal.

6. The server according to claim 1, wherein the processor is further configured to execute the set of instructions to:
  generate an identification and passcode based on login information of the user in the online social platform and an identification of the interactive application in the online social platform;
  log the user in a server of the interactive application by sending the identification and passcode to the server of the interactive application, so that the user does not need to log in the server of the interactive application through the page.

7. The server according to claim 1, wherein the presenting of the interactive application in the timeline comprises presenting the interactive application in a drop-down manner; so that:
  the terminal operates the interactive application when the interactive application is dropped down on the page, and
  the terminal suspends operating the interactive application when the interactive application is pulled up.

8. The server according to claim 1, wherein to provide the enriched message wherein the processor is further configured to execute the set of instructions to:
  accept the enriched message when the enriched message meets a predetermined content security requirement, and
  reject the enriched message when the enriched message fails to meet the predetermined content security requirement.

9. The server according to claim 8, wherein the processor is further configured to execute the set of instructions to determine whether the enriched message meets the predetermined content security requirement in a manner of combining automatic analysis and manual review.

10. A method for providing an enriched message in a microblog page, comprising:
  providing, by an online social platform, a page of the online social platform on a terminal of a user, the page being displayed in a timeline format;
  providing, by the online social platform, an enriched message associated with an interactive application in the timeline,
  wherein the enriched message is configured to direct the terminal to present the interactive application in the timeline when the user clicks the enriched message; and
  performing, by the online social platform, the following at an interval of predetermined duration:
    determining whether the enriched message meets a predetermined content security requirement,
    in response to determining that the enriched message does not meet the predetermined content security requirement, setting the enriched message in a reviewed state and prohibiting presentation of the enriched message on the online social platform, and
    when a number of enriched messages corresponding to the interactive application that initially met the predetermined content security requirement and was accepted by the online social platform but later fail to meet the predetermined content security requirement is greater than a preset threshold, stop accepting any further enriched message associated with the interactive application.

11. The method according to claim 10, wherein the online social platform is a microblog platform; and
  the interactive application is at least one of an electronic game application or an e-commerce application for closed loop transaction.

12. The method according to claim 10, wherein the enriched message is one of:
  a first type of enriched message, including an inline frame uniform resource locator (iframeurl) of the interactive application and an application introduction, and a second type of enriched message, including a download address for the interactive application and the application introduction.

13. The method according to claim 12, wherein when the page is a webpage of the online social platform, and the presenting of the interactive application presenting application content corresponding to the iframeurl in an inline frame (iframe) form on the page when the enriched message is the first type of enriched message; and connecting to the download address when the enriched message is the second type of enriched message.

14. The method according to claim 12, wherein when the page is a page of an online social platform application for mobile terminals, the presenting of the interactive application comprises:

opening to a network address corresponding to the iframeurl in an iframe form on the page when the enriched message is the first type of enriched message; and when the enriched message is the second type of enriched message:

starting the interactive application when the interactive application is installed in the terminal, and downloading the interactive application from the download address when the interactive application is not installed in the terminal.

15. The method according to claim 10, further comprising:

generating, by the online social platform, an identification and passcode based on login information of the user in the online social platform and an identification of the interactive application in the online social platform;

logging the user in a server of the interactive application, by the online social platform, by sending the identification and passcode to the server of the interactive application, so that the user does not need to log in the server of the interactive application through the page.

16. The method according to claim 10, wherein the presenting of the interactive application in the timeline comprises presenting the interactive application in a dropdown manner; so that:

the terminal operates the interactive application when the interactive application is dropped down on the page, and the terminal suspends operating the interactive application when the interactive application is pulled up.

17. The method according to claim 10, wherein the providing of the enriched message further comprises:

accepting, by the online social platform, the enriched message when the enriched message meets a predetermined content security requirement, and rejecting, by the online social platform, the enriched message when the enriched message fails to meet the predetermined content security requirement.

18. The method according to claim 17, further comprising determining whether the enriched message meets the predetermined content security requirement in a manner of combining automatic analysis and manual review.

* * * * *